(12) United States Patent
Johansson et al.

(10) Patent No.: US 9,524,815 B2
(45) Date of Patent: Dec. 20, 2016

(54) SURGE ARRESTER WITH MOULDED SHEDS AND APPARATUS FOR MOULDING

(71) Applicant: ABB Schweiz AG, Baden (CH)

(72) Inventors: Daniel Johansson, Grängesberg (SE); Christian Gustavsson, Ludvika (SE); Eija Lindberg, Ludvika (SE); Elisabeth Faxö, Ludvika (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/033,042

(22) PCT Filed: Nov. 5, 2013

(86) PCT No.: PCT/EP2013/073022
§ 371 (c)(1),
(2) Date: Apr. 28, 2016

(87) PCT Pub. No.: WO2015/067297
PCT Pub. Date: May 14, 2015

(65) Prior Publication Data
US 2016/0284447 A1    Sep. 29, 2016

(51) Int. Cl.
*H01C 7/10* (2006.01)
*H01C 7/12* (2006.01)
(Continued)

(52) U.S. Cl.
CPC .............. *H01C 7/12* (2013.01); *B29C 33/0038* (2013.01); *B29C 33/3842* (2013.01);
(Continued)

(58) Field of Classification Search
CPC .............. H01C 7/12; H01C 1/02; H01C 7/126
(Continued)

(56) References Cited

U.S. PATENT DOCUMENTS 2,608,600 A * 8/1952 Nilsson ..................... H01T 4/16
315/59
4,028,656 A * 6/1977 Schmunk ............... H01H 69/02
174/179
(Continued)

FOREIGN PATENT DOCUMENTS

CH          640666 A5    1/1984
EP         1936639 B1    7/2009
(Continued)

OTHER PUBLICATIONS

Internation Preliminary Report on Patentability Application No. PCT/EP2013/073022 Completed: Oct. 12, 2015:Mailing Date: Oct. 12, 2015 7 pages.
(Continued)

*Primary Examiner* — Kyung Lee
(74) *Attorney, Agent, or Firm* — Whitmyer IP Group LLC

(57) ABSTRACT

A high voltage surge arrester including insulating polymer housing with a protruding shed. The shed has an upper shed surface that forms a blunt angle with the longitudinal axis of the surge arrester and a lower shed surface. The lower shed surface includes an inner portion that forms an essentially right angle with said axis and an outer portion that forms an acute angle with said axis. Further the invention relates to an apparatus for molding an electrically insulating polymer housing.

13 Claims, 5 Drawing Sheets

(51) Int. Cl.
*H01B 19/00* (2006.01)
*H01C 1/02* (2006.01)
*B29C 33/44* (2006.01)
*B29C 33/38* (2006.01)
*B29C 33/42* (2006.01)
*B29C 33/00* (2006.01)
*B29L 31/34* (2006.01)

(52) U.S. Cl.
CPC .............. *B29C 33/42* (2013.01); *B29C 33/44* (2013.01); *H01B 19/00* (2013.01); *H01C 1/02* (2013.01); *B29K 2995/0007* (2013.01); *B29L 2031/3481* (2013.01)

(58) Field of Classification Search
USPC .......................................................... 338/21
See application file for complete search history.

(56) References Cited

U.S. PATENT DOCUMENTS

| | | | |
|---|---|---|---|
| 4,174,464 A | 11/1979 | Kawaguchi et al. | |
| 4,203,143 A * | 5/1980 | Imataki | H01C 7/123 361/120 |
| 4,740,659 A | 4/1988 | Kunieda et al. | |
| 4,749,824 A | 6/1988 | Orbeck | |
| 4,833,438 A * | 5/1989 | Parraud | H01C 7/12 164/102 |
| 4,989,115 A * | 1/1991 | Bourdages | H01C 7/12 338/21 |
| 5,220,134 A * | 6/1993 | Novel | H01B 17/325 174/169 |
| 5,497,138 A * | 3/1996 | Malpiece | H01C 7/12 338/21 |
| 5,602,710 A | 2/1997 | Schmidt et al. | |
| 5,648,132 A | 7/1997 | Abe et al. | |
| 5,652,690 A | 7/1997 | Mansfield et al. | |
| 5,684,665 A * | 11/1997 | Rudy | H01C 7/126 361/117 |
| 5,912,611 A * | 6/1999 | Berggren | H01C 7/12 338/21 |
| 6,051,796 A | 4/2000 | Kuhl et al. | |
| 6,225,567 B1 | 5/2001 | Kester | |
| 6,466,425 B1 * | 10/2002 | Shirakawa | H01C 7/112 361/111 |
| 7,522,399 B2 * | 4/2009 | Siljeholm | H01C 7/12 361/117 |
| 8,305,184 B2 * | 11/2012 | Klaube | H01C 7/12 338/21 |
| 8,629,751 B2 * | 1/2014 | Maher | H01C 7/102 338/20 |

FOREIGN PATENT DOCUMENTS

| | | |
|---|---|---|
| EP | 2444982 A1 | 4/2012 |
| JP | 2012248422 A | 12/2012 |
| WO | 9838653 A1 | 9/1998 |
| WO | 2015067297 A1 | 5/2015 |

OTHER PUBLICATIONS

International Search Report Application No. PCT/EP2013/073022 Completed: Jul. 17, 2014; Mailing Date: Jul. 29, 2014 5 pages.
Written Opinion of the International Searching Authority Application No. PCT/EP2013/073022 Mailing Date: Jul. 29, 2014 6 pages.

* cited by examiner

US 9,524,815 B2

SURGE ARRESTER WITH MOULDED SHEDS AND APPARATUS FOR MOULDING

TECHNICAL FIELD

The present invention pertains to a high voltage surge arrester comprising a varistor element surrounded by a polymer housing with a protruding shed, and to an apparatus for moulding a polymer housing with protruding sheds.

BACKGROUND

High voltage surge arresters are common in the field of electric power transmission and distribution. They may form part of a dissipative system by means of which currents are dissipated upon transient overvoltages occurring in an electric system. Such an arrester may comprise a plurality of varistor elements which, upon being subjected to a predetermined voltage, turns from a highly resistive state into an electrically conducting state. One end of the arrester may be connected to ground and the other end to an electric network. The varistor elements need to be electrically insulated and they are insulated as well as protected from the environment by means of an electrically insulating enclosure provided with sheds.

U.S. Pat. No. 8,305,184 B2 discloses a surge arrester and a mould in accordance with the preambles of the independent claims of the present patent application.

EP2444982 A1 discloses a shed for e.g. a surge arrester. The shed is shaped as a tapered disk with a curved free edge. In the embodiment of FIG. 9 of EP2444982 A1, the upper surface of the shed forms a blunt angle with respect to the longitudinal axis of the surge arrester whereas the lower surface extends perpendicularly from said axis.

SUMMARY

An object of the invention is to provide a high voltage surge arrester with varistor elements that are well protected from the environment. The surge arrester shall be comparatively easy and cost-efficient to manufacture.

These objects have been achieved by a high voltage surge arrester comprising a varistor element surrounded by an electrically insulating polymer housing with a protruding shed. The shed has an upper shed surface that forms a blunt angle with the longitudinal axis of the surge arrester, and a lower shed surface comprising an inner portion forming an essentially right angle with said axis and an outer portion forming an acute angle with said axis.

Surge arresters are typically mounted with their longitudinal axis aligned vertically. This means that, when the surge arrester is mounted, the above mentioned upper shed surface slopes downwards, the inner portion of the lower shed surface extends essentially horizontally, and the outer portion of the lower shed surface slopes downwards.

By forming the shed with such inner and outer portions of the lower surface, the varistor elements are well protected from the environment. The fact that, when mounted, the outer portion of the lower shed surface slopes downwards entails that the inner portion thereof, and likewise the insulating housing below the shed, are sheltered from the environment. Importantly, the present design brings the advantage that during manufacture, each shed, and therefore the entire insulating housing, is easy to remove from a mould. Furthermore, said design allows a slender yet dimensionally stable shed.

The peripheral free end of the shed may comprise a straight section that extends essentially in parallel with the longitudinal axis of the surge arrester. This entails advantages during manufacture, since moulds for the shed are easy to produce, endure high contact pressures and have a long life.

Preferably, the inner portion of the lower shed surface is level with said straight section. In this way, a mould forming the lower shed surface will be easy to produce.

Another object of the invention is to provide an apparatus for moulding an electrically insulating polymer housing with protruding sheds. The apparatus shall be comparatively easy and cost-efficient to manufacture.

This object has been achieved by an apparatus for moulding an electrically insulating polymer housing with protruding sheds, which apparatus comprises a first mould part and a second mould part which when brought together form a mould half for a shed. The first mould part has a first mould surface that is essentially evenly inclined for forming an upper shed surface. The second mould part has a second mould surface for forming a lower shed surface, the second mould surface comprising an inner mould surface that is essentially perpendicular to the rotational axis for forming an inner portion of the lower shed surface. The second mould surface further comprising an outer mould surface that is inclined with respect to the inner mould surface for forming an outer portion of the lower shed surface.

BRIEF DESCRIPTION OF THE DRAWINGS

An embodiment of the invention will be explained in greater detail below with reference to the accompanying drawing, wherein.

DETAILED DESCRIPTION

Figure 1:
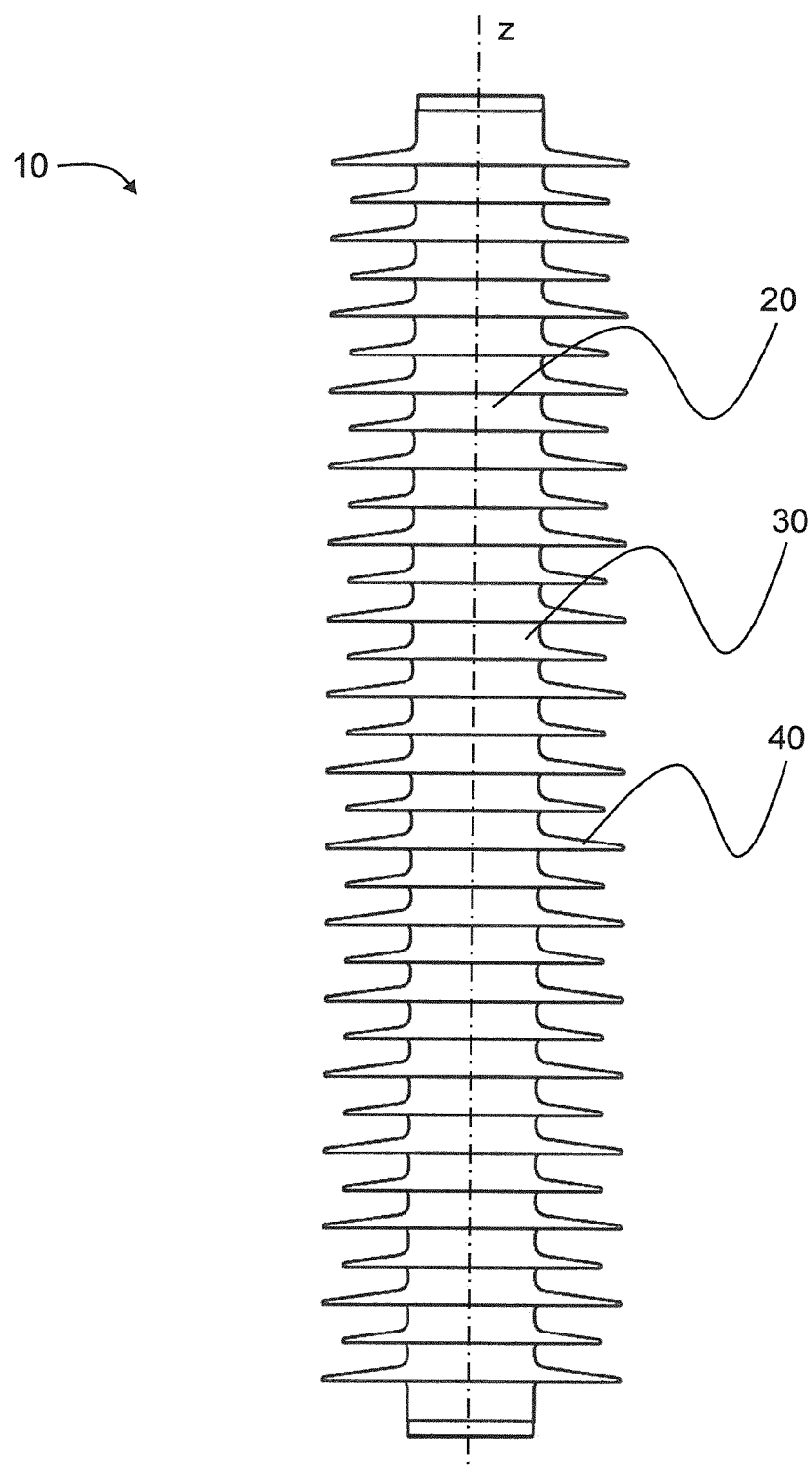
FIG. 1 is a side view of a high voltage surge arrester comprising a surrounding insulating polymer housing with a protruding sheds.
Figure 2:
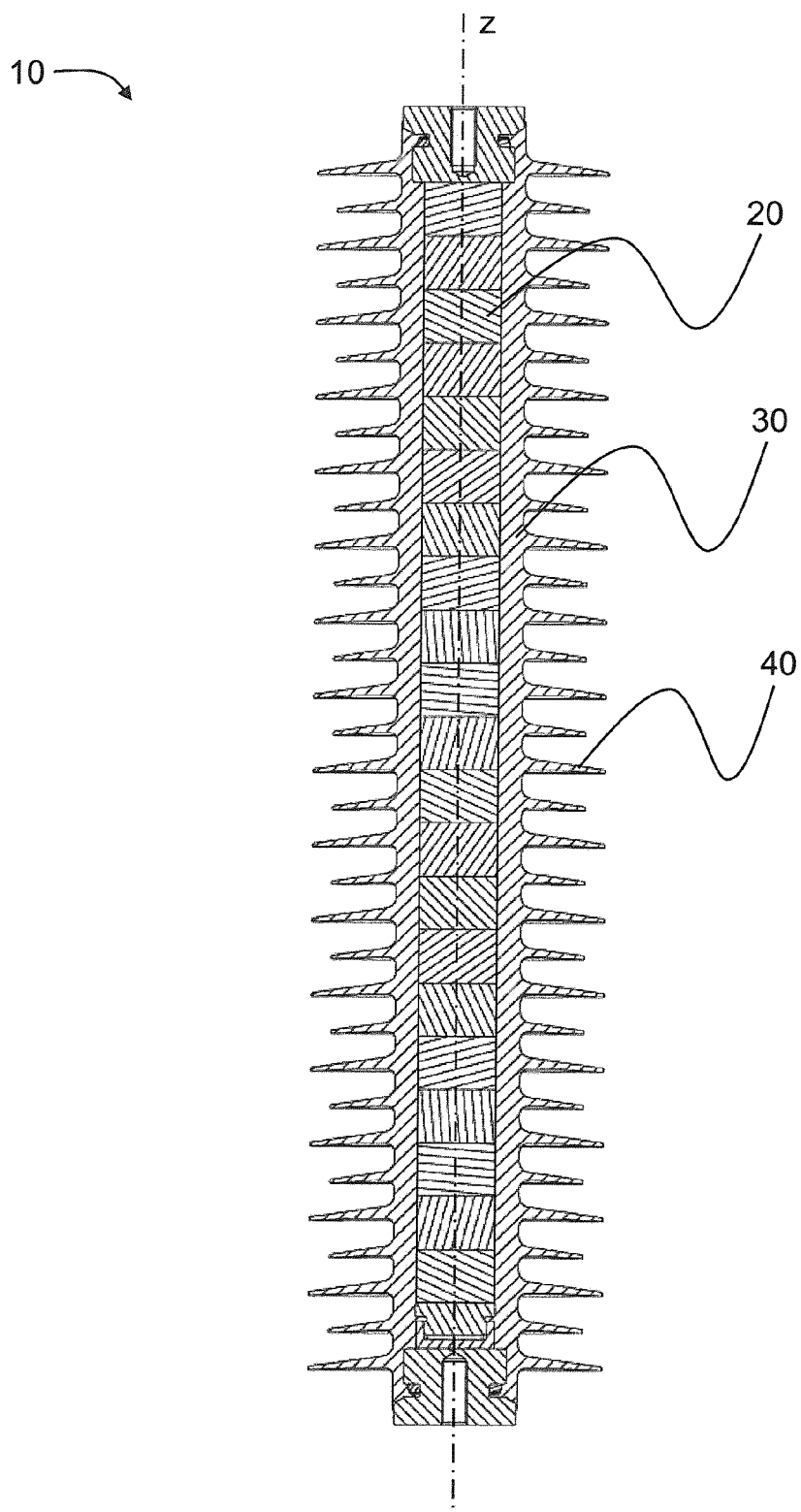
FIG. 2 is a cross-section of such a high voltage surge arrester.

FIGS. 1 and 2 disclose a high voltage surge arrester 10. These side views show the surge arrester 10 as it is normally mounted when in use; with its longitudinal axis z aligned vertically. When the expressions "upper" and "lower" are used in the following, they refer to the surge arrester 10 as presented in FIGS. 1 and 2.

Typically, the high voltage surge arrester 10 is used outdoor. The surge arrester is adapted for outdoor use and can be referred to as an outdoor surge arrester. High voltage is here defined as voltages of 1 kV and above.

The surge arrester 10 of FIG. 1 comprises a covering in the form of an insulating polymer housing 30 with protruding sheds 40. A suitable polymer material is silicone rubber. The cross-section of FIG. 2 exposes a column of varistor elements 20, and also an upper terminal and a lower terminal with screw connections. Between the lower terminal and the lowermost varistor element, a combined length adjustment and pivot unit is disclosed, such a unit is described in EP1936639 B1.

The upper terminal is to be connected to an electric network and the lower terminal is to be grounded. This means that, when in use, there is a large difference in electrical potential between the upper and lower ends of the surge arrester. Now, the purpose of the sheds 40 is to prolong the creepage distance along the outer surface of the surge arrester 10, as is well known to the skilled person.

The sheds 40 extend radially from the longitudinal axis z of the surge arrester 10. The polymer housing 30 can be said to comprise a tubular part and the sheds 40 extending therefrom. Since there is a plurality of consecutive sheds 40 arranged along the surge arrester 10, the sheds 40 cover each other in the longitudinal direction, i.e. the vertical direction when in use. This means that each shed, apart from the top one, will be sheltered from rain and pollution by the neighbouring upper shed.

By providing alternating wide and narrow sheds as in FIGS. 1 and 2, the narrow ones will serve to particularly well prolong the creepage distance, since they are completely covered by the wide sheds. In this example, 17 wide sheds and 16 narrow sheds are provided. The top shed and also the bottom shed are wide sheds.

An advantage of furnishing a surge arrester with alternating wide and narrow sheds, with a wide shed at the upper end and also at the lower end, is that not only the upper narrow shed will be well sheltered, but also the lower end of the surge arrester including the lower terminal. This means that the number of wide sheds will equal the number of narrow sheds +1. As an alternative, the surge arrester may be furnished with an equal number of wide and narrow sheds, e.g. 16 wide sheds and 16 narrow sheds.

Figure 3:
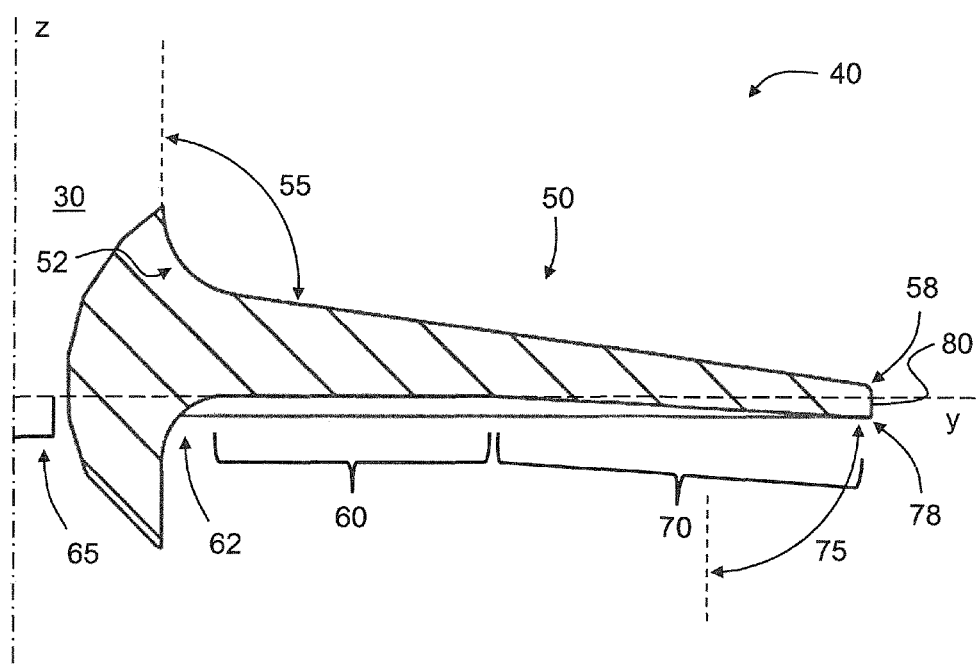
FIG. 3 is an enlargement of a shed of FIG. 2.

FIG. 3 is an enlarged cut-out of a part of the surge arrester of FIG. 2, showing in detail one wide shed 40 and a portion of the tubular part of the polymer housing 30. A wide shed differs from a narrow shed in terms of certain dimension, as is clear from the figures and will be described below. The shed 40 is disc-shaped, and the cross-section shown in FIG. 3 is rotationally symmetric around the longitudinal centre axis z of the surge arrester. As can be understood by comparing FIGS. 2 and 3, the longitudinal axis z shown in FIG. 3 is displaced in parallel compared to the longitudinal centre axis z shown in FIG. 2.

The shed 40 has an upper shed surface 50 and a lower shed surface 60, 70. At the radially innermost part of the shed 40, there are inner radiuses 52, 62 forming smooth transitions between the upper and lower shed surfaces and the tubular part of the polymer housing 30. The radially outermost part of the shed 40 comprises an outer radius 58 on the upper surface 50, whereas the lower surface terminates at a relatively sharp edge 78.

The fact that the outer lower corner 78 of the shed 40 is relatively sharp entails that droplet formation is facilitated and the surge arrester 10 will dry quickly.

The upper shed surface slopes downwards. In other words, the upper shed surface 50 forms a blunt angle 55 with the longitudinal axis z. Per definition, a blunt angle is larger than 90°, and the present angle 55 is preferably equal to or larger than 92° and equal to or smaller than 103°, a more preferred interval being 95-101°.

Apart from the inner and outer radiuses 52, 58, the upper shed surface 50 is straight and slopes continuously downwards along the entire extension of the shed 40.

The lower shed surface, on the other hand, comprises an inner portion 60 that is essentially horizontal and an outer portion 70 that slopes downwards. In other words, the inner portion 60 extends essentially perpendicularly from the longitudinal axis z and the outer portion forms an acute angle 75 with the longitudinal axis z. An acute angle is smaller than 90°, and the present angle 75 is preferably equal to or smaller than 88° and equal to or larger than 81°, a more preferred interval being 84-88°. The inner portion 60 is straight and extends essentially horizontally from the inner radius 62 to the outer portion 70. The outer portion 70 is straight and slopes continuously downwards.

The present lower shed surface having an inner portion 60 being essentially horizontal and an outer portion 70 extending downwards at an angle with respect to the inner portion 60 provides a shed that is particularly dimensionally stable. A lower shed surface which is entirely flat and perpendicular to the longitudinal arrester axis (EP2444982 A1 FIG. 9) involves the risk that the shed may curl or warp during manufacture, especially if such a shed is of a slender design.

In principle, a shed in accordance with the present invention may have a lower shed surface with more than one essentially horizontal portion, and/or more than one sloping portion. However, in the most preferred embodiment of the invention, as shown herein, the lower shed surface comprises one single essentially horizontal portion 60 and one single sloping portion 70.

As can be seen to the right in FIG. 3 (and also in the enlarged cut-out of FIG. 4), the peripheral free end of the shed 40 comprises a straight section 80. As has been described, the outer upper corner of the shed 40 is rounded 58, below this radius 58 there is a straight section 80 that extends to the outer lower corner 78 of the shed 40. Advantageously, this straight section 80 extends essentially in parallel with the longitudinal axis z. Such a design facilitates manufacturing, as will be described below. Preferably, the straight section 80 extends along more than half the peripheral free end thickness of the shed 40. In this embodiment, the straight section 80 extends along approximately 75% of said end thickness. More precisely, the peripheral free end of the shed 40 consists of the straight section 80 and the radius 58.

Figure 4:
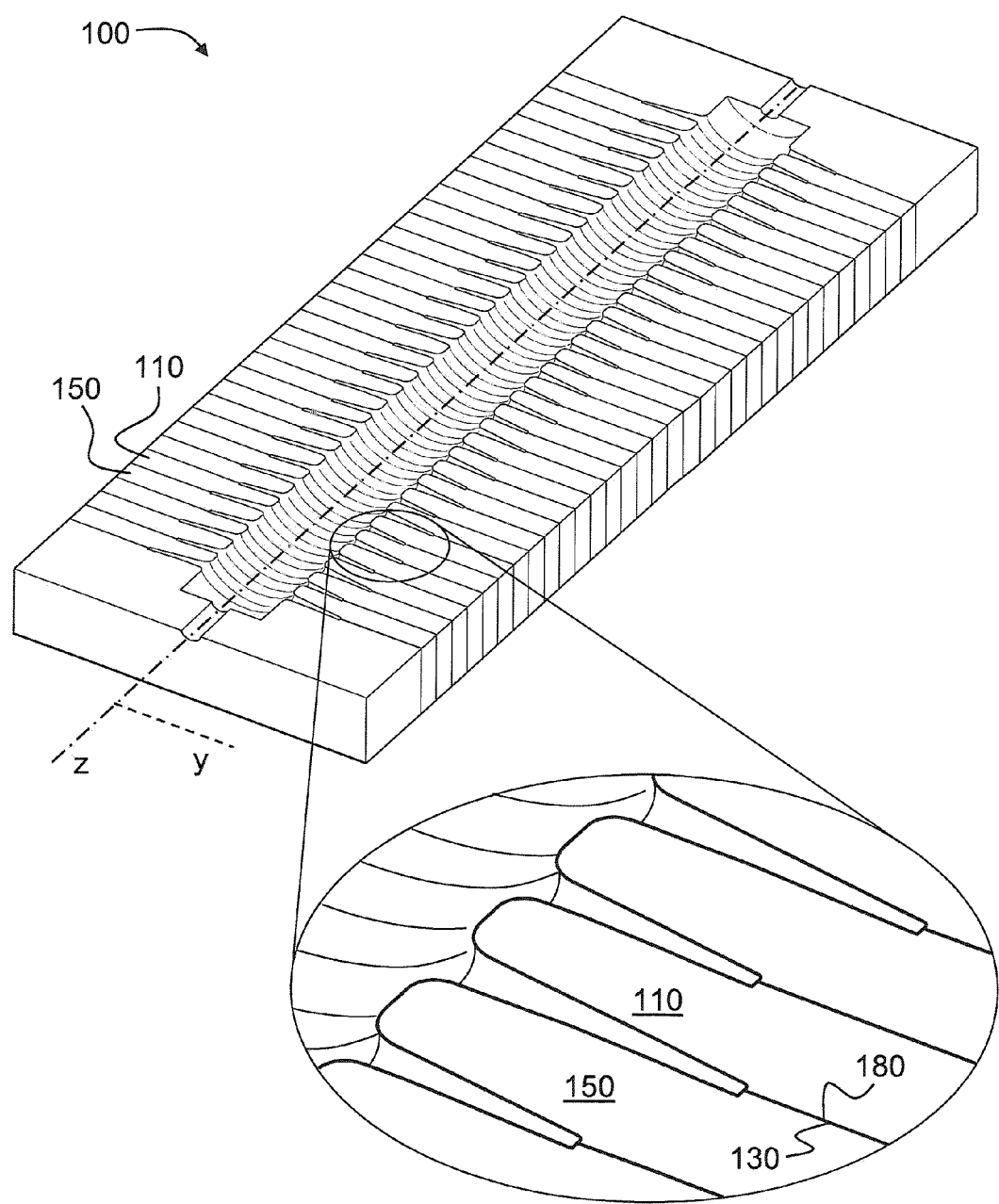
FIG. 4 shows a mould half for moulding an electrically insulating polymer housing with protruding sheds, which mould half comprises a plurality of adjacent first and second mould parts.
Figure 5:
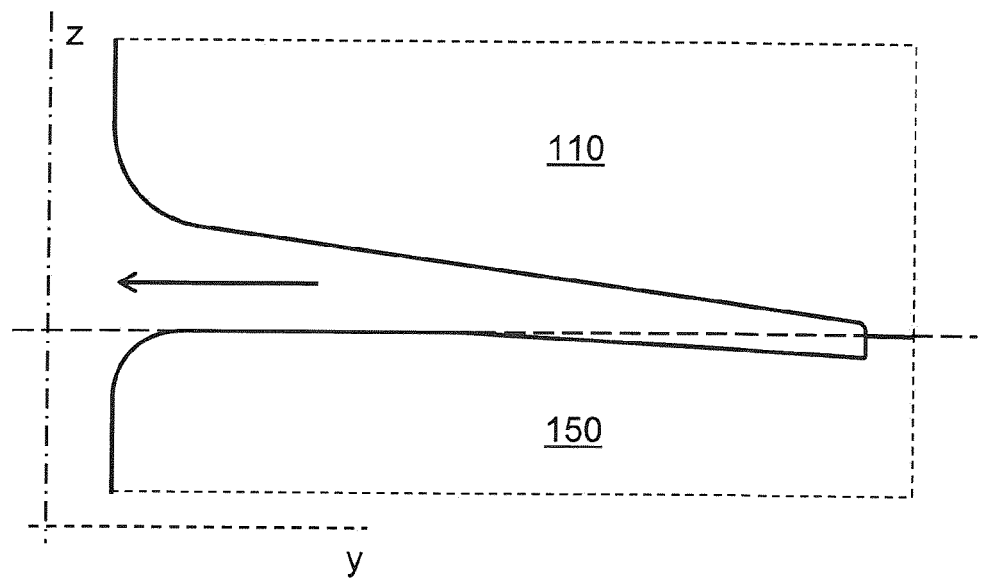
FIG. 5 is an explanatory sketch illustrating two such first and second mould parts when brought together (at the top) so as to form a mould half for a shed, and (at the bottom) also at a distance from each other in an exploded view.
Figure 5:
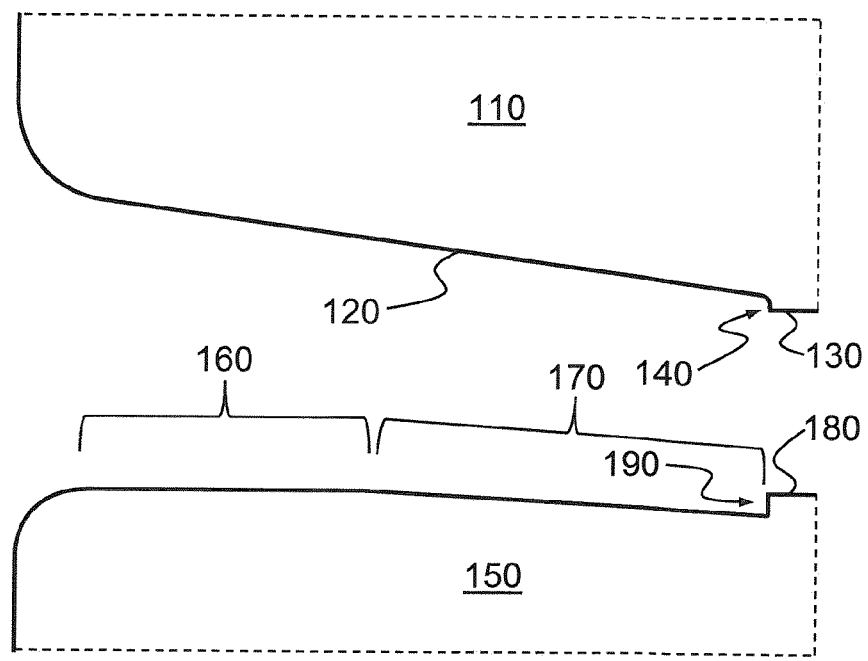

In FIG. 3, there is illustrated a radial axis y, which extends orthogonal to the longitudinal axis z. The radial axis y is aligned with the inner portion 60 of the lower shed surface, and passes through the straight section 80. In other words, the straight section 80 is level with the inner portion 60 of the lower shed surface. This means that a line drawn parallel to and level with the inner portion 60 of the lower shed surface intersects the straight section 80. Such a design facilitates manufacturing, as will be described below. Corresponding axes, z and y, are shown in FIGS. 4 and 5.

In the shown wide shed 40 (FIG. 3), the inner and outer portions 60, 70 of the lower shed surface are of substantially the same length or extension. Preferably, the inner portion 60 constitutes 40-50% of the shed extension. The outer portion 70 constitutes 50-60% of the shed extension. Throughout this text, by shed extension is meant the total length of the shed measured from the tubular part of the polymer housing 30 to the peripheral free end of the shed 40. It is to be noted that since any inner 62 and/or outer radiuses are also comprised in the shed extension as defined, the extensions of the inner and outer portions 60, 70 may not sum up to 100% of the shed extension.

No detailed view of a narrow shed is presented here. The narrow shed primarily differs from the wide shed in that the inner portion 60 is shortened, as can be seen in the enlarged cut-out of FIG. 4. In a narrow shed 40, the inner portion 60 constitutes 20-30% of the shed extension. The outer portion 70 constitutes 70-80% of the shed extension.

A shed 40 in accordance with the present invention comprises an essentially horizontal portion 60 that constitutes 20-80% of the shed extension and a sloping portion 70 that constitutes 20-80% of the shed extension. Such a design is favourable for providing a slender shed, thus requiring less material for manufacture, which yet offers good shelter. The angular deflection between the inner and outer portions 60, 70 of the lower shed surface makes the shed dimensionally stable.

FIG. 4 shows a mould half 100 which can be used for moulding the insulating polymer housing 30 with the protruding sheds 40 shown in FIGS. 1-3. Two mould halves 100 are combined to form a mould volume when a housing 30 with sheds 40 is to be moulded, as is described in U.S. Pat. No. 8,305,184 B2.

Each mould half 100 comprises a plurality of first mould parts 110 and second mould parts 150. Each shed 40 is formed by two neighbouring first and second mould parts 110, 150, as is shown in FIG. 5. As can be seen in the encircled enlarged cut-out of FIG. 4, the mould parts 110, 150 are shaped so as to form a shed with a lower surface having an inner portion that is essentially horizontal and an outer portion that slopes downwards, and with a peripheral free end with a straight section.

FIG. 5 shows the mould parts 110, 150 when assembled (at the top of FIG. 5), as in FIG. 4, and also in an exploded view (at the bottom of FIG. 5). The mould parts 110, 150 comprise mould surfaces 120, 160, 170 that form the mould for the sheds 40. The mould surface 120 of the first mould part 110 corresponds to the upper surface 50 of the shed 40, and the mould surface 160, 170 of the second mould part 150 corresponds to the lower surface 60, 70 of the shed 40. As is to be understood, FIG. 5 is an explanatory sketch aiming at emphasizing how the mould surfaces of the mould parts are shaped in order to form the shed.

Consequently, the mould surface 120 of the first mould part 110 is essentially evenly inclined and the mould surface 160, 170 of the second mould part 150 comprises an inner mould surface 160 that is essentially perpendicular to the longitudinal axis z of the mould half 100 and an outer mould surface 170 that is inclined with respect to the inner mould surface 160. The faces of the mould parts 110, 150 also include radiuses for forming the above described shed radiuses 52, 58, 62.

Further, the first and second mould parts 110, 150 comprise respective contact shoulders 130, 180. These contact shoulders 130, 180 are pressed against each other when the mould parts 110, 150 are arranged together to form a mould half 100, as is shown in FIGS. 4 and 5 (at the top). The contact shoulders 130, 180 are treated so that the surface roughness is low, which means that a tight seal can be obtained. Preferably, the contact shoulders 130, 180 are grinded. The surfaces of the contact shoulders 130, 180 that contact each other are perpendicular to the longitudinal axis z.

As is clear from FIG. 5, the inner corners 140, 190 of the contact shoulders are essentially right-angled. Put in other words, the angles formed by the surfaces of the contact shoulders 130, 180 and the inner sides (facing the mould volume) of the contact shoulders 130, 180 are approximately 90°. In the presented embodiment, said respective angles equal 90°.

The right-angled inner corners 140, 190 of the contact shoulders bring the advantage that the mould parts 110, 150 are easy to manufacture. The mould parts 110, 150 can be produced in a lathing operation.

Should the inner corners 140, 190 of the contact shoulders instead be acute, there would be an undercut in the contact shoulders. Such an undercut is more complicated to manufacture, and would also impair the strength of the contact shoulders.

In order to avoid such undercuts, the inner corners 140, 190 of the contact shoulders shall be right-angled or blunt, i.e. equal to or larger than 90°.

As can be seen in FIG. 5, especially indicated by the dashed line in the top representation of FIG. 5, the contact shoulder 180 of the second mould part 150 is level with the inner mould surface 160. More precisely, the contact surface of the contact shoulder 180 is level with the inner mould surface 160. This simplifies manufacture of the second mould part 150. The contact shoulder 180 and also the inner mould surface 160 may be grinded, even in the same operation and by the same grinding machine, such as a flat grinding machine. If both the contact shoulders 130, 180 are grinded, especially in a in a flat grinding machine, high quality mould parts 110, 150 can be produced.

When the moulded polymer housing 30 is to be removed from a mould half, the sheds 40 have to be deformed to some extent. Removal of the polymer housing can be done by lifting the housing out of the mould half 100 of FIG. 4. During removal, the sheds 40 are pulled out from between the first and second mould parts 110, 150, as is indicated by the arrow in the top representation of FIG. 5. As is clear from FIG. 4 and especially FIG. 5, the portion of the shed 40 that is located on a level lower than the inner mould surface 160, i.e. below the dashed line in the top representation of FIG. 5, has to be deformed in order to pass the inner mould surface 160.

As compared to prior art design, e.g. as disclosed in U.S. Pat. No. 8,305,184 B2, the shed profile of present invention is easier to remove from a mould. U.S. Pat. No. 8,305,184 B2 discloses sheds with lower surfaces that slope continuously downwards. The horizontal portion 60 of the present invention leads to a reduction of the so called backdraught.

The invention claimed is:

1. A high voltage surge arrester comprising a varistor element surrounded by an electrically insulating polymer housing with a protruding shed, said shed having an upper shed surface that forms a blunt angle with the longitudinal axis of the surge arrester and a lower shed surface, characterised in that the lower shed surface comprises
    an inner portion that forms an essentially right angle with said axis and
    an outer portion that forms an acute angle with said axis, wherein
    said inner portion constitutes 20-80% of the shed extension and
    said essentially right angle is 89-91°.

2. The high voltage surge arrester of claim 1, wherein the peripheral free end of the shed comprises a straight section that extends essentially in parallel with the longitudinal axis of the surge arrester.

3. The high voltage surge arrester of claim 2, wherein said straight section extends along more than half the peripheral free end thickness of the shed.

4. The high voltage surge arrester of claim 2, wherein said straight section is level with said inner portion of the lower shed surface.

5. The high voltage surge arrester of claim 1, wherein the lower shed surface comprises one single inner portion and one single outer portion.

6. The high voltage surge arrester of claim 1, wherein the outer portion of the lower shed surface constitutes 20-80% of the shed extension.

7. The high voltage surge arrester of claim 1, wherein said blunt angle is equal to or larger than 92°.

8. The high voltage surge arrester of claim 7, wherein said blunt angle is equal to or smaller than 103°.

9. The high voltage surge arrester of claim 1, wherein said acute angle is equal to or smaller than 88°.

10. The high voltage surge arrester of claim 9, wherein said acute angle is equal to or larger than 81°.

11. An apparatus for moulding an electrically insulating polymer housing with protruding sheds, which apparatus comprises a first mould part and a second mould part which when brought together form a mould half for a shed, wherein said first mould part comprises a first mould surface that is essentially evenly inclined for forming an upper shed surface and said second mould part comprises a second mould surface for forming a lower shed surface, characterised in that the second mould surface comprises an inner mould surface that is essentially perpendicular to the rotational axis for forming an inner portion of the lower shed surface and an outer mould surface that is inclined with respect to the inner mould surface for forming an outer portion of the lower shed surface, wherein said inner mould surface constitutes 20-80% of the shed extension and said inner mould surface forms an angle of 89-91° with respect to the rotational axis.

12. The apparatus of claim 11, wherein the first and second mould parts comprise respective contact shoulders which are adapted to form a tight seal when the mould parts are brought together, and wherein the inner corners of said contact shoulders are right-angled or blunt.

13. The apparatus of claim 11, wherein the first and second mould parts comprise respective contact shoulders which are adapted to form a tight seal when the mould parts are brought together, and wherein the contact shoulder of the second mould part is level with the inner mould surface.

* * * * *